Aug. 10, 1948.     D. BLITZ     2,446,520
TRANSMITTER FOR DISTANCE DETERMINING SYSTEM
Filed April 17, 1945

INVENTOR.
Daniel Blitz
BY
ATTORNEY

Patented Aug. 10, 1948

2,446,520

UNITED STATES PATENT OFFICE 2,446,520

TRANSMITTER FOR DISTANCE DETERMINING SYSTEM

Daniel Blitz, Princeton, N. J., assignor to Radio Corporation of America, a corporation of Delaware Application April 17, 1945, Serial No. 588,769

5 Claims. (Cl. 250—17)

This invention relates to improvements in radio reflection distance and speed measuring systems of the frequency modulation type, and more particularly to the compensation of the effects of variations in power supply voltage upon the accuracy of such systems.

The principal object of the present invention is to provide an improved method of and means for preventing or substantially reducing variations in the response of systems of the described type, with variations in the primary power supply voltage.

Another object of the instant invention is to provide an improved method of and means for producing a square wave voltage of constant amplitude.

A further object is to provide an improved method of and means for compensating the residual variations in output voltage of a voltage regulator system.

Figure 1:
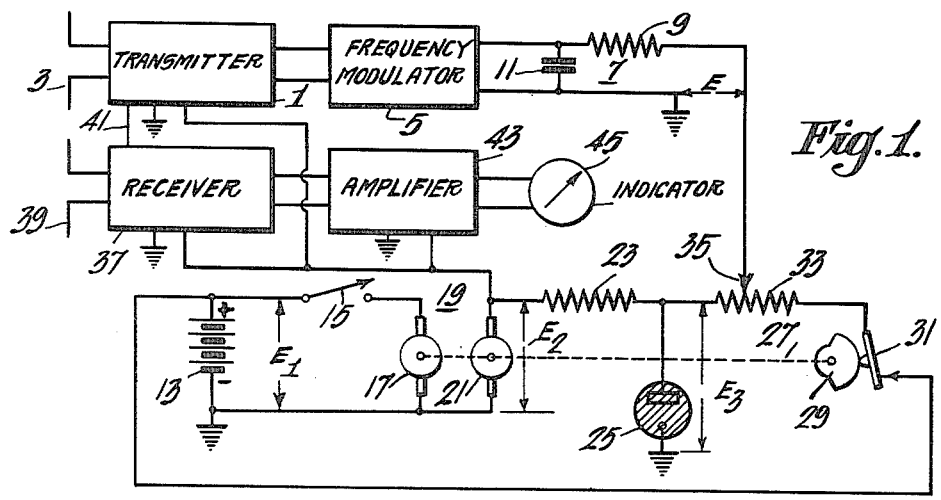
Figure 2:
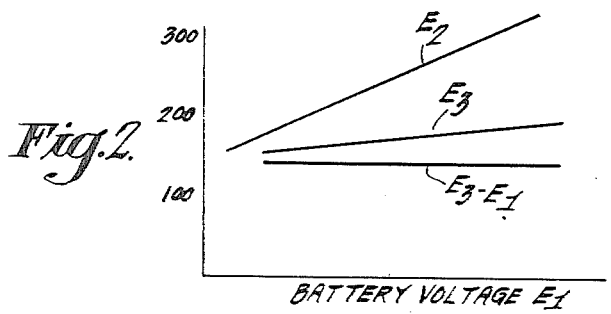
Figure 3:
Figure 4:
Figure 5:
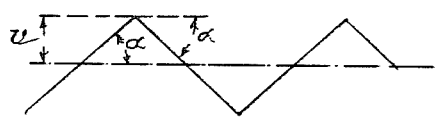
Figure 6:

The invention will be described with reference to the accompanying drawing of which:

Figure 1 is a schematic circuit diagram of a radio reflection distance measuring system, embodying the invention, Figure 2 is a graph illustrating the relations between various voltages which are produced in the operation of the system of Figure 1, Figures 3 and 4 are graphs of voltages of square-wave form which occur in the operation of the system of Figure 1 under certain conditions, and Figures 5 and 6 are graphs of triangular wave voltages produced by integration of the voltages illustrated in Figures 3 and 4 respectively.

Referring to Figure 1, a radio transmitter 1 is provided with an antenna 3 and is connected to a frequency modulator 5. The modulator 5 may be of the type described in copending U. S. patent application Serial No. 471,003, filed January 1, 1943, by S. V. Perry, and entitled Capacity modulator unit, or any other known device for varying the frequency of the transmitter 1 in accordance with a modulating voltage. The modulator 5 is connected to a wave shaping circuit 7, which may be merely an integrating circuit, or may be a more elaborate circuit such as that described in copending U. S. patent application Serial No. 546,537, filed July 25, 1944, by Royden C. Sanders, Jr., and entitled Wave shaping circuits, now Patent No. 2,403,616, issued July 9, 1946. For the explanation of the present invention, the wave shaping circuit 7 is shown as a conventional L-type network, comprising a series resistor 9 and shunt capacitor 11.

A D.-C. source 13, such as a storage battery, is connected through a switch 15 to the low voltage armature 17 of a motor-generator device 19, of the type commonly referred to as a "dynamotor." The high voltage armature 21 of the dynamotor 19 is connected directly to the anode supply circuit of the transmitter 1 and through a resistor 23 to a voltage regulator tube 25 of the gaseous glow type.

The shaft 27 of the dynamotor 19 is connected to a cam 29, arranged to open and close a switch 31 as the shaft is rotated. The positive terminal of the low voltage source 13 is connected through the switch 31 to one end of a resistor 33. The other end of the resistor 33 is connected to the positive terminal of the regulator tube 25. An adjustable tap 35 on the resistor 33 is connected to one side of the wave shaping circuit 7. The other side of the wave shaping circuit is returned to the negative terminals of the battery 13, the dynamotor 19, and the regulator tube 25 through a common ground connection.

A receiver 37 is provided with an antenna 39, and is coupled to the transmitter 1 by means of a transmission line 41. The output circuit of the receiver 37 is connected to an amplifier 43, which is connected to a frequency responsive indicator 45. The anode supply circuits of the receiver 37 and the amplifier 43 are connected to the high voltage terminals of the dynamotor 19.

In the operation of the system, the switch 15 is closed, energizing the low voltage armature 17 of the dynamotor 19, to rotate the high voltage armature 21 and the shaft 27. The output voltage $E_2$ of the dynamotor is applied directly to the transmitter, receiver, and amplifier anode circuits, and through the resistor 23 to the glow tube 25. The tube 25 provides a relatively constant voltage drop across its terminals, of approximately 150 volts. When the switch 31 is open, substantially the same potential appears at the tap 35 of the resistor 33 as that at the positive terminal of the glow tube 25. When the switch 31 is closed, the potential at the right hand end of the resistor 33 is that of the source 13, while that at the left hand end remains the same as that of the positive terminal of the glow tube.

As the shaft 27 rotates, the switch 31 is alternately opened and closed by the cam 29, changing the voltage at the tap 35 cyclically and discontinuously between two values, providing a square wave variation of voltage as illustrated by Figure 3. This voltage alternately charges and discharges the capacitor 11 through the resistor 9, so that the voltage across the capacitor 11 varies as shown in Figure 5.

The substantially triangular wave voltage across the capacitor 11 is applied to the frequency modulator 5, causing cyclical variation of the frequency of the transmitter 1. Part of the output of the transmitter 1 is radiated to the surface or object whose distance is to be determined, and reflected thereby to the receiver antenna 39.

The reflected signal is mixed in the receiver 37 with energy transferred directly through the line 41. The resulting difference frequency, or beat, is a measure of the distance, since this frequency is determined by the time required for the radiated signal to reach the reflecting object and return to the receiver. The beat frequency output of the receiver 37 is amplified by the amplifier 43 and applied to the frequency responsive indicator 45, which may be calibrated in units of distance.

The relationship between the beat frequency and the distance is proportional to the rate of change of the transmitted frequency. Denoting the beat frequency in cycles per second, as $f_b$ and the rate of change of transmitted frequency in cycles per second as $$\frac{df_t}{dt}$$

$$f_b = \frac{2D}{C} \cdot \frac{df_t}{dt} \text{ cycles per second}$$

where D is the distance in feet, and C is the velocity of propagation of radio waves in feet per second. It is apparent that for a given calibration of the system of Figure 1, the average value of $$\frac{df_t}{dt}$$

must be maintained constant to achieve correct indication of distance.

The rate of change $$\frac{df_t}{dt}$$

of transmitted frequency is directly related to the slope $\alpha$ of the triangular wave input to the modulator 5. The values of the resistor 9 and the capacitor 11 are made such that $$RC \gg t$$

where R is the resistance of the resistor 9 in ohms, C is the capacitance of the capacitor 11 in farads, and $t$ is the nominal duration of each square wave pulse provided by operation of the switch 31. The slope of the triangular wave voltage of Figure 5 is then $$\alpha = \frac{E}{RC} \text{ volts per second}$$

where E is the amplitude of the square wave. In other words, $$\frac{df_t}{dt}$$

depends only upon the square wave amplitude E, and the constants R and C. Thus the problem is that of keeping E constant.

The voltage $E_1$ of the primary source 13 may vary widely under operating conditions, particularly if the source 13 is a storage battery connected to other load devices and to an automatically controlled charging device. The speed of the dynamotor 19 is approximately proportional to the voltage applied to its driving armature 17. The output voltage $E_2$ is also substantially proportional to the input voltage, as shown by the graph of Figure 2. The voltage $E_3$ across the regulator tube 25 is not perfectly constant, but varies with the variations in the voltage $E_2$, although through a much narrower range.

Since the postive terminal of the source 13 is connected to one end of the resistor 33 and the positive terminal of the tube 25 is connected to the other end, a change in voltage at the tap 35 caused by variation of the voltage across the tube 25 tends to be cancelled by the corresponding (and causative) variation in the voltage of the source 13. Thus the amplitude E remains substantially constant. This is shown in Figure 2, where the line $E_3-E_1$, representing the total voltage impressed across the resistor 33, is seen to vary less than the regulated voltage $E_3$ with variations in supply voltage $E_1$.

Figure 4 shows the square wave voltage which is produced when the voltage $E_1$ of the source 13 is higher than its nominal value. The dynamotor 19 runs faster, so that the duration $t'$ of each pulse is shorter than that which would occur with normal supply voltage. The amplitude $E_1$ however, has not changed.

Referring to Figure 6, the corresponding triangular wave voltage is of a higher frequency and lower amplitude. The slope $\alpha$, however, is the same as that of the triangular wave of Figure 5. Thus as the voltage $E_1$ increases, the band through which the frequency of the transmitter 1 varies is decreased, but the frequency of variation is proportionately increased, so that the rate of change of frequency remains constant.

The above described action will take place even though the switch 31 is operated independently of the dynamotor, by a separate constant speed motor for example, because the rate $$\frac{df_t}{dt}$$

is independent of the square wave frequency withing wide limits.

Although the invention has been described with reference to a particular type of radio reflection system, it will be apparent that it may be used with equal benefit in systems in which $$\frac{df_t}{dt}$$

is varied intentionally (as by adjustment of the tap 35 in Figure 1) since variations in the supply voltage will be prevented from superimposing an undesired variation upon the intentional variation.

Moreover, the particular wave shaping circuit 9 described in the present illustration need not be used, because it is characteristic of all such wave shaping circuits to provide a slope $\alpha$ depending only upon the amplitude E of the applied voltage. It is to be understood also that the application of the invention is not restricted to radio distance measuring systems, but may be employed in other applications which require square wave voltages of constant amplitude.

I claim as my invention:

1. In a radio reflection distance measuring system including a transmitter and modulator means for cyclically varying the frequency of operation thereof, a source of D.-C. energy subject to fluctuations in voltage, a voltage convertor connected to said source and including a mechanically moving part, a voltage regulator connected to the output circuit of said convertor, said voltage regulator providing an output which varies in voltage in accordance with variations in the voltage of said source but in a relatively much smaller percentage, a switch mechanically coupled to said moving part for cyclical operation thereby, a resistor connected to said voltage regulator and through said switch to said D.-C. source, in such polarities that the voltages from said source and said regulator oppose each other, a wave shaping circuit connected to said resistor and including an integrating network, and means for applying the output of said wave shaping circuit to said modulator means.

2. A system for cyclically varying the frequency of operation of a radio transmitter at substantially constant rate, including a voltage responsive modulator device, a source of D.-C. energy subject to fluctuations in voltage, a voltage convertor connected to said source, a voltage regulator connected to the output circuit of said convertor, said voltage regulator providing an output which varies in voltage in accordance with variations in the voltage of said source but in a much smaller percentage, a periodic switch, a resistor connected to one terminal of said voltage regulator and through said switch to the terminal of like polarity of said source, a wave shaping circuit connected across at least a portion of said resistor, and means for applying the output of said wave shaping circuit to said modulator.

3. A square wave voltage generator system including a D.-C. source, voltage convertor means connected to said source, a voltage regulator connected to the output circuit of said voltage convertor means, a periodic switch, and a resistor connected from one terminal of said regulator and through said switch to the terminal of like polarity of said source.

4. A frequency modulation system for radio transmitters including a voltage responsive variable reactance element, a source of D.-C. energy subject to fluctuations in voltage, a voltage convertor connected to said source, a voltage regulator connected to the output circuit of said convertor, a periodic switch, a resistor connected to said convertor and through said switch to said source in such manner that the voltage variations in the output of said regulator are opposed by those of said source, and means coupling said resistor to said variable reactance element.

5. A voltage regulator system including a source subject to fluctuations of voltage, a voltage convertor connected to said source, a voltage regulator connected to said convertor and providing an output which varies in voltage in accordance with variations in the voltage of said source but to a lesser percentage degree, and an impedance element connected between one terminal of said source and one terminal of said regulator in such polarities that variations in the output voltage of said regulator are opposed by the variations in the voltage of said source.

DANIEL BLITZ.

REFERENCES CITED

The following references are of record in the file of this patent:

UNITED STATES PATENTS

| Number | Name | Date |
| --- | --- | --- |
| 1,802,563 | Kuhn et al. | Apr. 28, 1931 |
| 2,206,123 | Rinia et al. | July 2, 1940 |